United States Patent [19]

Norell

[11] Patent Number: 5,517,563
[45] Date of Patent: May 14, 1996

[54] NETWORK STRUCTURE AND A SIGNALLING PROTOCOL FOR A TELECOMMUNICATION NETWORK

[75] Inventor: Bror L. Norell, Älvsjö, Sweden

[73] Assignee: Telefonaktiebolaget LM Ericsson, Stockholm, Sweden

[21] Appl. No.: 112,537

[22] Filed: Aug. 27, 1993

[30] Foreign Application Priority Data

Aug. 28, 1992 [SE] Sweden .................................. 9202489

[51] Int. Cl.$^6$ .................................................. H04M 7/00
[52] U.S. Cl. ........................... 379/220; 379/230; 379/221; 379/231; 379/269
[58] Field of Search .................................... 379/220, 221, 379/89, 88, 279, 210, 247, 203, 246, 202, 201, 269, 230, 231; 370/94.1

[56] References Cited

U.S. PATENT DOCUMENTS

| | | | |
|---|---|---|---|
| 4,455,455 | 6/1984 | Little | 379/203 |
| 4,464,543 | 8/1984 | Kline et al. | 379/247 |
| 4,674,115 | 6/1987 | Kaleita et al. | 379/201 |
| 4,924,500 | 5/1990 | Lewis et al. | 379/201 |
| 5,008,930 | 4/1991 | Gawrys et al. | 379/210 |
| 5,048,081 | 9/1991 | Gavaras et al. | 379/221 |
| 5,113,499 | 5/1992 | Ankney et al. | 370/94.1 |

*Primary Examiner*—Jeffery Hofsass
*Assistant Examiner*—Scott Wolinsky
*Attorney, Agent, or Firm*—Burns, Doane, Swecker & Mathis

[57] ABSTRACT

A network structure and a signalling protocol for a telecommunication network. The nodes of the communication network are interconnected by a connection network as well as a signalling network. Computer software controlling the communication equipment of each node is divided into two types of software, connection related software and service related software. Connection related software groups of different nodes communicate with each other via a first protocol while service related software groups of different nodes communicate via a second protocol different from the first protocol. Between an originating node of a call and the terminating node of the same call a direct signalling path is established in the signalling network allowing for the addition of new service features in the originating and terminating nodes without the need to implement the new service features in the inbetween nodes via which the same call is routed in the connection network. A general signalling protocol supports the addition of new service features to existing nodes as well as the execution and management of the new services and the services already existing in the telecommunication network. The signalling protocol is divided into a basic protocol and one or more service specific protocols called dialogues. The basic protocol is used to establish a signalling path between service related software groups in the originating and terminating nodes and to establish dialogues along the signalling path. This allows for a modular addition/removal of dialogues to the basic protocol which remains unchanged.

17 Claims, 9 Drawing Sheets

NETWORK STRUCTURE AND A SIGNALLING PROTOCOL FOR A TELECOMMUNICATION NETWORK

TECHNICAL FIELD

The present invention relates generally to a network structure and to a signalling protocol for telecommunication networks, such as telephone networks and telecommunication services networks which include a number of computer software controlled telephone exchanges.

Network structure is meant to mean the manner in which functions are distributed between telephone exchanges and how the functions communicate with one another. Those rules and conventions that are applied when the functions communicate with one another are referred to as protocol.

BACKGROUND ART

FIG. 1 illustrates how telephone exchanges are placed in a telephone network. Reference numerals 10 and 12 identify two local exchanges to which subscribers 20 are connected. Reference numeral 11 identifies a transit exchange which is capable of connecting traffic between different local exchanges. The telephone exchanges 10, 11, 12 in the network illustrated in FIG. 1 are connected to one another by means of trunk connections 30. The telephone exchange 11 in the specific network shown in FIG. 1 is a tandem exchange, because direct trunk lines are found between all local exchanges. The feature of interest in the FIG. 1 network is that traffic can be moved between the local exchanges 10 and 12 through the tandem exchange 11. The reference numeral 40 identifies signalling connections for so-called common channel signalling. A typical feature of present-day telephone networks is that the signalling connections are separate from the trunk connections. In the case of old techniques, signalling is effected on the trunk connections, for instance with tones on the trunk connection between the exchanges. As mentioned, the signalling network has been separated from the trunk connections in latter-day techniques. Signalling in the telephone network takes place between the network telephone exchanges and is intended to control the traffic, including among other things the transfer of cradle-switched subscriber states and of address information relating to called subscribers.

FIG. 2 illustrates generally one of the telephone exchanges 10, 11 or 12 of the telephone network illustrated in FIG. 1. More specifically, only those functions which are relevant to technical problems that are fundamental to the present invention are described. The telephone exchange, in this case the local exchange 10, comprises a computer 100 which controls coupling equipment. The coupling equipment comprises a subscriber interface 101, switching equipment 102, and a trunk connection interface 103. The switching equipment 102 functions to connect telephone channels for telephone calls between the subscriber interface 101 and the trunk connection interface 103. A computer 100 controls signalling from the subscriber 20 to the local exchange 10, via a subscriber line 25 and the subscriber interface 101. Similarly, on the trunk side, the computer 100 controls connection of trunk circuits 30 to the switching equipment 102 via the trunk connection interface 103. The computer 100 also has an interface 104 towards the signal network, via a signal terminal. The computer performs a number of items of software 110 which have different functions in the telephone exchange, such as to control the connection of calls or maintenance functions, for instance the collection of billing information. These items of software 110 can signal with items of software in other telephone exchanges, via the signal terminal 104. When the software 110 signals with software in other telephone exchanges, the protocols referenced P40 in FIG. 2 are used. These protocols are thus used in the signal connections 40, although they are shown separately in FIG. 2.

The signalling technique that predominates in telephone networks today is based on common channel signalling in accordance with CCITT or ANSI recommendations.

When a telephone connection is to be established from one telephone exchange to another, i.e., when a subscriber has lifted the receiver of a telephone set and has sent to the telephone exchange 10, via the subscriber interface 101, the number of subscriber B to which the call shall be established and the digits of the B-number have been identified in the telephone exchange 10, it is assumed in the illustrated case that the subscriber to which the number dialled relates is not present in the own telephone exchange 10, but in another telephone exchange, for instance the telephone exchange 12 in FIG. 1. In order to establish a call connection to the called subscriber, the B-subscriber, in the local exchange 12, there is used a so-called circuit related signalling process, in which a trunk connection 30 is selected between the telephone exchanges 10 and 12 and in which signalling refers to a selected circuit in the trunk line. Typically, there is chosen in the trunk line a time slot that is able to transmit a telephone call. The signals are transmitted with reference to this time slot and signalling takes place with a protocol P40 that can be interpreted by respective software in the two telephone exchanges. Thus, the connection is not effected directly from software to software in the telephone exchange 10 and 12, and instead the telephone exchange 10 signals to the telephone exchange 12 by referring to the chosen physical circuit that is used. The protocol used when signalling is, for instance, TUP (Telephony User Part) or ISUP (Integrated Services Digital Network User Part). Thus, it is this protocol P40 that is used by the software 110 over the signalling connection 40 in order to establish the telephone call connection on the trunk line between the telephone exchanges.

In the case of this signalling procedure, solely telephone exchanges that have direct trunk connections therebetween are able to communicate with one another. If, in accordance with the FIG. 3 illustration, a telephone call is to be connected between two subscribers 21 and 22 which are connected to different local exchanges 10 and 12 and which lack direct trunk connections 30 between one another, it is necessary to establish the call connection through the agency of one or more transit telephone exchanges 11. This is because the signals must always have a reference to a circuit in the trunk connections.

FIG. 3 illustrates simply a transit case between three telephone exchanges, i.e. between two local telephone exchanges 10 and 12 and a transit exchange 11, which passes traffic between the local exchanges 10 and 12. In the illustrated case, the A-subscriber 21 in the local exchange 10 has requested a call to the B-subscriber 22 in the other local exchange 10. Thus, when establishing the call connection, no signalling takes place directly between the local exchanges 10 and 12, and signalling must therefore pass via the transit exchange 11. Actually, the call connection between the local exchanges 10 and 11 is divided into two connection halves which are mutually connected in the transit exchange. The local exchange 10 selects a trunk circuit to the transit exchange 11 and uses a protocol P41 to establish one half of the connection to the transit exchange 11. The transit exchange 11 establishes a connection half to the local exchange 12, by selecting a trunk circuit on the trunk line 30 and using a protocol P42 to establish the other connection path to the local exchange 12. When the local exchange 12 has accepted the call, the transit exchange 11 connects the call from the A-subscriber 21 and is, in principle, transparent to the call.

The telephone service offered to subscribers 21 and 22 is dependent on the software in all telephone exchanges 10, 11, 12 active in a connection and also on those protocols P41 and P42 that are used by the exchanges for communication therebetween. If a new function is to be introduced, for instance automatic callback in the event of an engaged number, it is necessary for this function to be implemented in the software in all telephone exchanges that are active in the process of establishing a connection from subscriber A to subscriber B, and also that the protocol P41 and the protocol P42 used between the software are capable of handling and controlling the new function. Thus, it is necessary to modify all three telephone exchanges and all protocols when introducing a new function. Since telephone calls can be connected through many different paths through a telephone network in one country, it is necessary for all telephone exchanges to support the functionality that is offered to subscribers in the local exchanges. This is a disadvantage, particularly when desiring to provide in the network functions that are directed towards a specific subscriber category, for instance the subscribers in a particular company. Even though the company may have subscriber connections in only a few telephone exchanges, for instance four working places in a town are connected to different telephone exchanges in the same town, it is not sufficient to modify the software in these telephone exchanges, since a call may pass along different routes through the network of the country concerned. It is therefore necessary for the protocol between different telephone exchanges to be mutually compatible when wishing to introduce the new functionality. When the company concerned is spread over many different working places in the country, it is necessary to update a very large number of different telephone exchanges.

Another problem encountered with present-day telephone networks concerns the routing of telephone calls from one subscriber to another. Typically, telephone numbers and telephone networks are built-up hierarchically, so that different parts of a telephone number relate to different geographical regions and areas. Normally, outlying regions are preceded with an area routing number which corresponds to a routing number area serving as a routing number exchange which handles incoming traffic to all subscribers located within this routing number area. Further parts of the telephone number, normally the first two or three digits of the number, are used to identify the local exchange to which given subscribers are connected. Referring to FIG. 4, there is shown a number of local telephone exchanges 10, 12, 14, 15, of which exchanges 10 and 14 are connected to a routing number exchange 16 located in a routing number area 18, whereas the local telephone exchanges 10 and 15 are connected to another routing number telephone exchange 17 which is located in another routing number area 19. The routing number telephone exchanges 16 and 17 are connected to a transit exchange 11. Assume that a telephone call shall be connected from one subscriber belonging to exchange 10, furthest to the left in FIG. 4, to a subscriber connected to the local exchange 12, furthest to the right in FIG. 4. The local exchange 10 will not recognize the B-number of the subscriber in the local exchange 12, but will transfer the B-number to its routing number exchange 16, which in turn recognizes that the number is concerned with another routing number area and therefore transfers the call to a transit exchange 11. The transit exchange 11 passes the call to the routing number area of the B-subscriber, more specifically to the routing number exchanges 17 in the routing number area 19. The routing number exchange 17 analyzes further parts of the B-number, in order to establish the local exchange to which the B-subscriber is connected, and switches the call to this local exchange, in the illustrated case the local exchange 12. The disadvantage with this type of telephone call routing procedure is that a subscriber is forced to change telephone numbers when he moves between the areas served by different telephone exchanges. A subscriber may also be forced to change his telephone number when it is necessary to move his connection from one telephone exchange to another in conjunction with restructuring or extending the telephone network. This represents a disadvantage to the individual subscriber and may also involve additional costs to the network manager, who must plan restructuring of the network in good time and inform all subscribers concerned with this restructuring of the changes that will be made to the subscriber numbers. Information of this nature incurs heavy costs.

Modern telephone networks include a further possibility of signalling directly between telephone exchanges and other equipment in the telephone network. Such signalling is based on the ability of the software in a telephone exchange or in some other equipment to address functions directly in another telephone exchange or in some other equipment. This enables purely signal channels to be established between different items of equipment in the telephone network, without relating the signalling process to a trunk circuit when connecting a call. This direct addressing procedure is used typically to address central functions in the telephone network, such as so-called free-phone services (In Sweden 020-numbers, in the U.S.A. 800-numbers) or to call subscriber data bases in the mobile telephone network.

FIG. 5 shows a typical example which includes the same units as those shown in FIG. 3 with the addition of central equipment 13 which permits conversation to be made with the aid of a protocol P43 which is tailored to the functionality provided by equipment 13. This protocol P43 is separate from the protocols P41 and P42. When a subscriber 21 requires access to the service concerned, for instance an 020-number with regard to intelligent networks, or an 010-number with regard to mobile telephone networks, the telephone exchange 10 discovers that it is unable to handle the number requested and therefore transfers the call to the telephone exchange 11, which discovers that the call is directed to a directory number which requires particular treatment, and therefore calls the software in the telephone exchange 3 which can handle this directory number. The equipment 13, typically a network data base, responds to the query from the telephone exchange 11 by disclosing the telephone number to which the call from subscriber 21 shall be routed. Signalling between the telephone exchanges 11 and 13 is not circuit-related, and when the telephone exchange 11 has learned of the destination to which the call shall be routed, signalling is effected to the relevant telephone exchange with the aid of circuit-switched signalling in the aforedescribed manner. The use of free signalling when calling software in the equipment 13 in order to obtain an answer to where a requested functionality is found in the network can be employed to solve the problem with the fixed relationship of a telephone number with the geographical location of a subscriber when the equipment 13 is comprised of a network data base which keeps an account of where the subscribers are located. The drawback with such a solution, which thus means that free signalling can be used and central functions that are capable of performing execute special services are obtained in the network, is that it is necessary to modify the software in selected, standard telephone exchanges, the telephone exchanges 10, 11 and 12 in the FIG. 5 illustration. For instance, it is necessary for the telephone exchange 11 in FIG. 5 to include software which will recognize a mobile telephone number 010 or an 020-number. Exchanges which do not recognize these numbers shall transfer the number upwards in the exchange hierarchy. The exchange which recognizes the numbers must be capable of starting communication with the data base and use a separate protocol for this purpose. From the aspect of establishing connections, the ability of only some telephone exchanges to identify such service-calling numbers (010, 020, and so on) is a disadvantage. For instance, in the case of a mobile telephony network about 80% of the traffic is comprised of traffic that passes between an exchange and a mobile subscriber, both of which are located in the near region of a telephone exchange. If the telephone exchange 10 were to have the functionality of being able to recognize such a service-calling number, it would also be possible to introduce an optimal routing selection in the network for the establishment of a connection to the B-side. It is costly to modify software in telephone exchanges. Consequently, a trade-off is made between those gains that can be made from a call connection aspect by modifying the software in each telephone exchange and the costs entailed by such software modification. However, there is a need for a telecommunication network in which many different types of services can be introduced and identified in a similar way, in addition to those services that are identified by such 010 and 020 numbers. It would be disastrous if it was necessary to modify software in each of the telephone exchanges within the network with a protocol corresponding to the protocol P43 which is adapted to the specific service to be introduced, when introducing a new service into the network.

DISCLOSURE OF THE INVENTION

The present invention relates to the provision of a network structure and used protocols for a telecommunication system with which the aforesaid drawbacks encountered when practicing present standpoints of techniques are eliminated.

More specifically, the invention relates to a method of arranging signalling between telephone exchanges in a telecommunication network with the intention of:

Enabling where a subscriber is connected in the telephone network to be localized without the subscriber number being associated with a telephone exchange;

enabling functions to be distributed over telephone exchanges included in the telecommunication network, more specifically so that a software implemented can be added subsequently to centrally located telephone exchanges without needing to modify the software of all telephone exchanges of the telecommunication network, while, at the same time, enabling all telephone exchanges in the network to have access to the added functionality; and enabling signalling between the software of different telephone exchanges to be extended in a modular fashion.

According to the present invention, signalling between the telephone exchanges of the telecommunication network is characterized by seven points:

A. Signalling is divided up into two signalling procedures, a first signalling procedure which takes place directly between those telephone exchanges which handle the subscribers in the telephone call connection, e.g., the local telephone exchanges 10 and 12 in FIG. 4, and a second signalling procedure which establishes those connections required for the telephone call, i.e., those connections which establish the actual speech channel between the parties concerned.

B. The software in the telephone exchanges is divided into:
  (i) service-handling software which controls the handling of subscriber teleservices with the aid of the first signalling procedure, which deals with the subscribers involved in the telephone call in accordance with A. above; and
  (ii) a connection-establishing part which controls the establishment of those connections, i.e., speech routes, required for the telephone call, with the aid the second signalling procedure according to A. above.

When the telephone connection concerned is not a connection between two subscribers but, for instance, a connection between two intercommunicating computers, the connections established are not speech channels, but, e.g., packet data channels, packet data channels of mutually different speeds, or free 64 kb data connections. In the case of broadband connections, other types of connections can be established.

C. Signalling is effected via logic connections, hereinafter referred to as signal paths, which are established between the software groups of those telephone exchanges which shall signal for a given telephone call. Thus, a signal path is established between the service-related software in the local exchanges, and the signal path is established directly between the local exchanges concerned in the handling of the service. On the other hand, other logic connections are established for handling the actual establishment of a connection. Logic connection is meant to mean the ability to establish several logic connections on a physical signal path, e.g., the path 40 in FIG. 1; compare for instance a packet-switched network. In the simplest case, a logic connection comprises the agreement of those parties wishing to communicate with one another to a special identity for those messages which are to be sent along the logic connection. Logic connections may have different end destinations. For instance, one logic connection may concern a telephone call, and another logic connection may concern another call.

D. Routing of a telephone call to the telephone exchange which shall handle a call to a given telephone number is an integrated part of establishing the signalling connection according to point C. above. Among other things, the establishment of the signalling connection for the first signalling procedure according to A. involves finding the correct telephone exchange of the B-subscriber.

E. Routing according to point D. above may involve redirecting the signalling once or several times, by analyzing the call from a telephone exchange in the central functions of the network and pointing to a new receiver of the call. The attempt to establish a connection from a telephone exchange can be redirected in increments up to the time that the destination is finally pointed-out.

F. The redirection according to point E. can be effected without involving the calling software. The software found in the telephone exchange of the subscriber A is not influenced by involving a central function. This enables new central functions to be added subsequently in a network, without influencing the software of existing telephone exchanges.

G. Those protocols used to signal between software groups of different telephone exchanges can be extended in a modular fashion with new parts which support new telecommunication services. This enables the functionality to be added not only to the actual telephone exchanges but also to the signalling protocols.

BRIEF DESCRIPTION OF THE DRAWINGS

The invention will now be described in more detail with reference to the accompanying drawings, in which.

BEST MODES OF CARRYING OUT THE INVENTION

Figure 5:
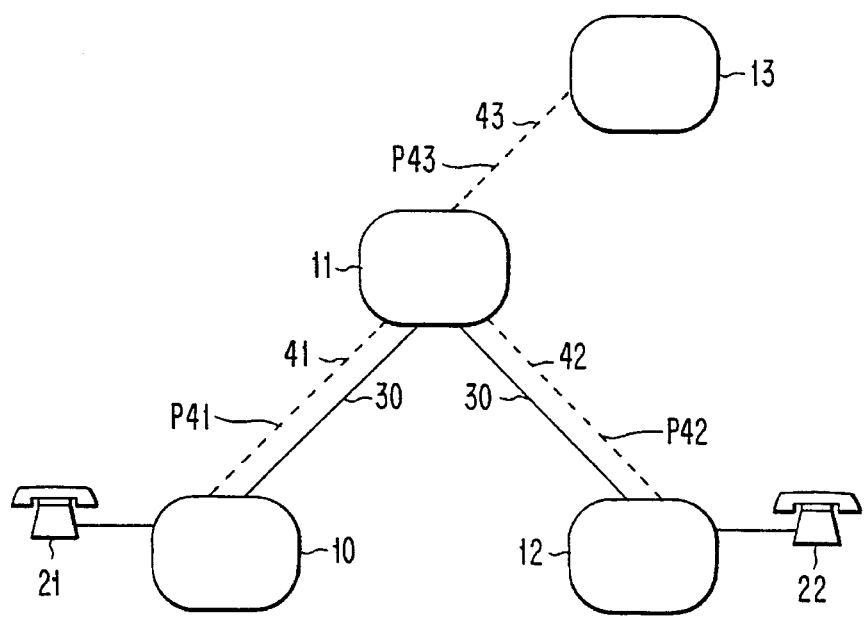
FIG. 5 illustrates a known technique of obtaining free signalling, i.e., not channel-bound, to a central functionality of a telecommunication network.
Figure 6:
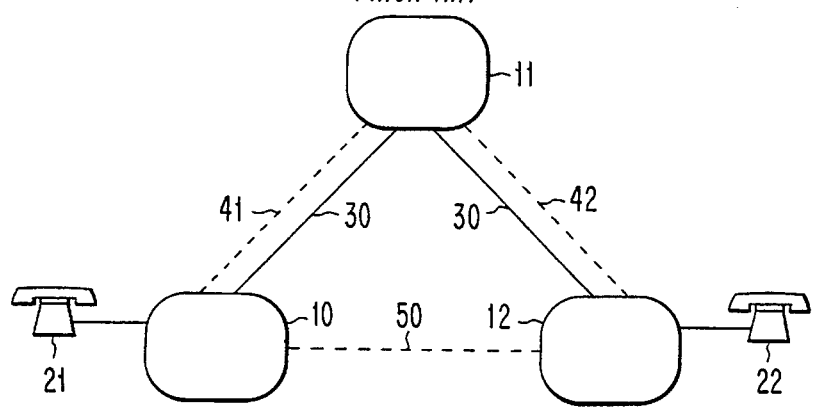
FIG. 6 illustrates a network in which those signal connections required in accordance with the present invention can be achieved in a first manner.

FIG. 6 illustrates an inventive network structure by means of which all nodes in the network whose software is capable of communicating with one another are able to establish signalling connections therebetween. The nodes are referenced 10, 11 and 12 and are the same nodes as those illustrated in FIG. 5, for instance. The novelty of the network shown in FIG. 6 resides in that all telephone exchanges that are intended to communicate mutually also have a signalling connection. The signalling connections 41 and 42 with the protocols P41 and P42 are the same as those shown in FIG. 5, while the novelty resides in a direct signalling connection between the local exchanges or nodes 10 and 12.

Figure 7:
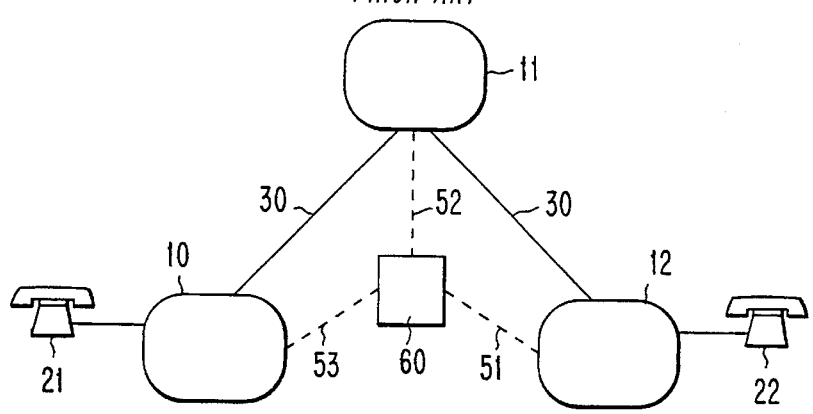
FIG. 7 illustrates another known manner of achieving signal connections in a telecommunication network.

There are many different ways in which signalling can be configured in order for all nodes whose respective software shall be capable of communicating with one another are able to establish signalling paths therebetween. FIG. 7 illustrates an example in which signalling can take place over an off-line signalling network with the aid of a signal switching node 60 which is connected to the nodes 10, 11, 12 in the telecommunication network via signalling paths or connections 51, 52, 53. The network exchanges can be referred to as signal points, SP, and the signal switching node functions as a switch in the signal network, in the same manner as an STP (Signal Transfer Point) in common channel signalling procedures according to CCITT and ANSI recommendations.

The signal switching node reads the address of a message and routes the message further in the signal network. The signal network is a free-standing or off-line network in relation to the switching network formed by the trunk connections. The signal links will not be shown in the following Figures, which consequently show only those protocols that are used in signalling processes. Only those signal paths which can be established over the signal network will be shown. FIGS. 6 and 7 thus illustrate the physical signalling network. If all signal links were to be shown in the following Figures, the Figures would become extremely obscure.

Figure 1:
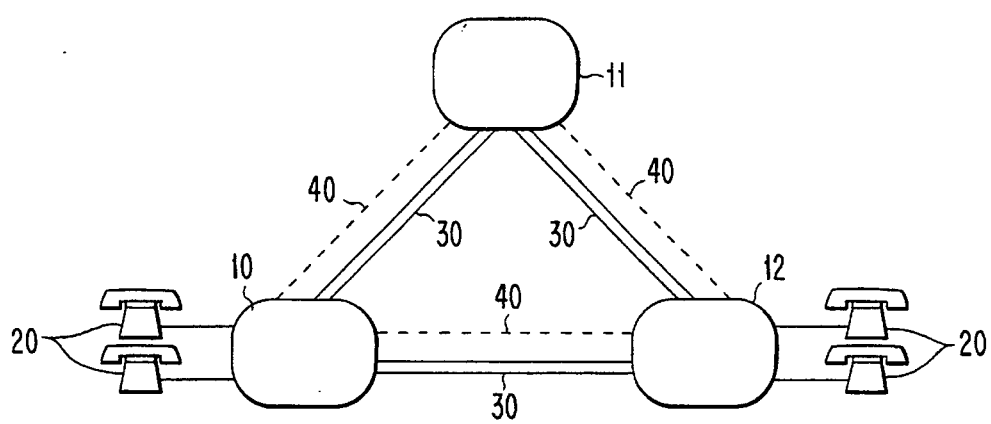
FIG. 1 illustrates schematically a known telecommunication network.
Figure 2:
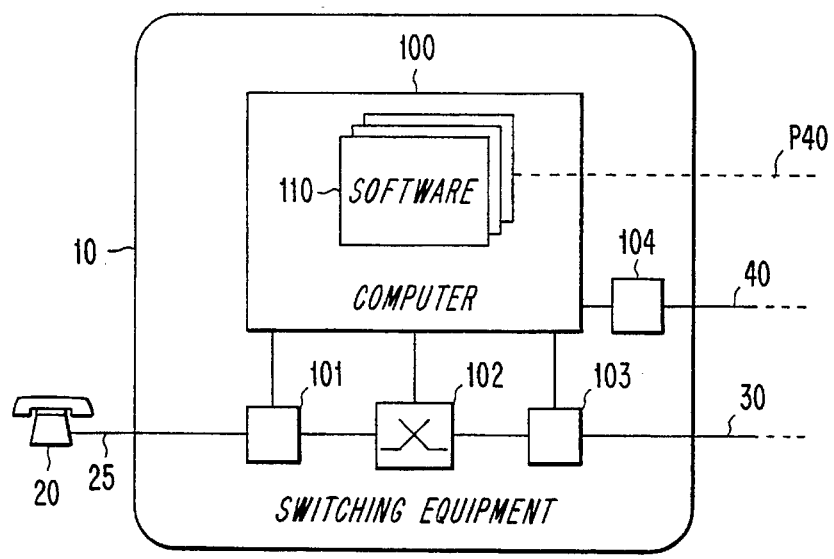
FIG. 2 illustrates schematically the functionality found in a telephone exchange in the network illustrated in FIG. 1.
Figure 3:
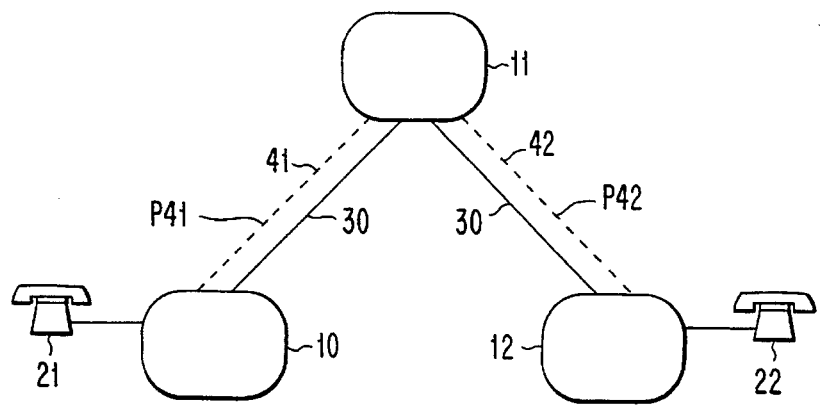
FIG. 3 illustrates an example of another known telephone network in which there are no direct trunk connections between the illustrated local exchanges 10 and 12.
Figure 9:
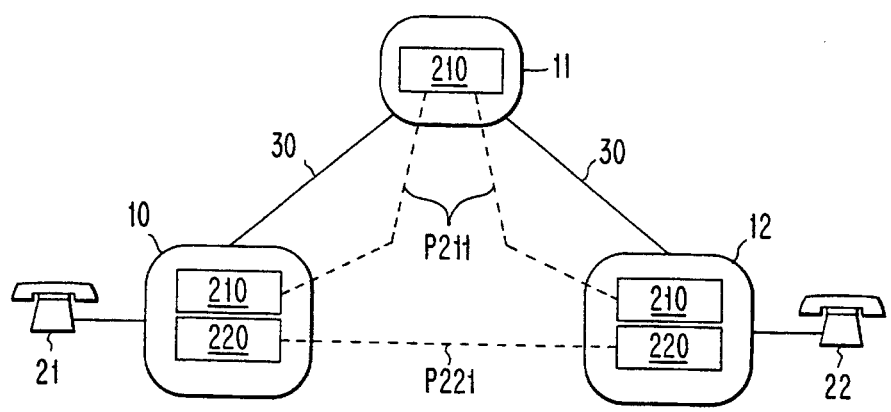
FIG. 9 illustrates a network structure in which the connection-establishing group of software in different telephone exchanges signal to one another with a first protocol, and in which the connection-establishing group of software signal to one another with a second protocol and over paths which are separate from those paths over which connection-related signalling takes place.
Figure 8:
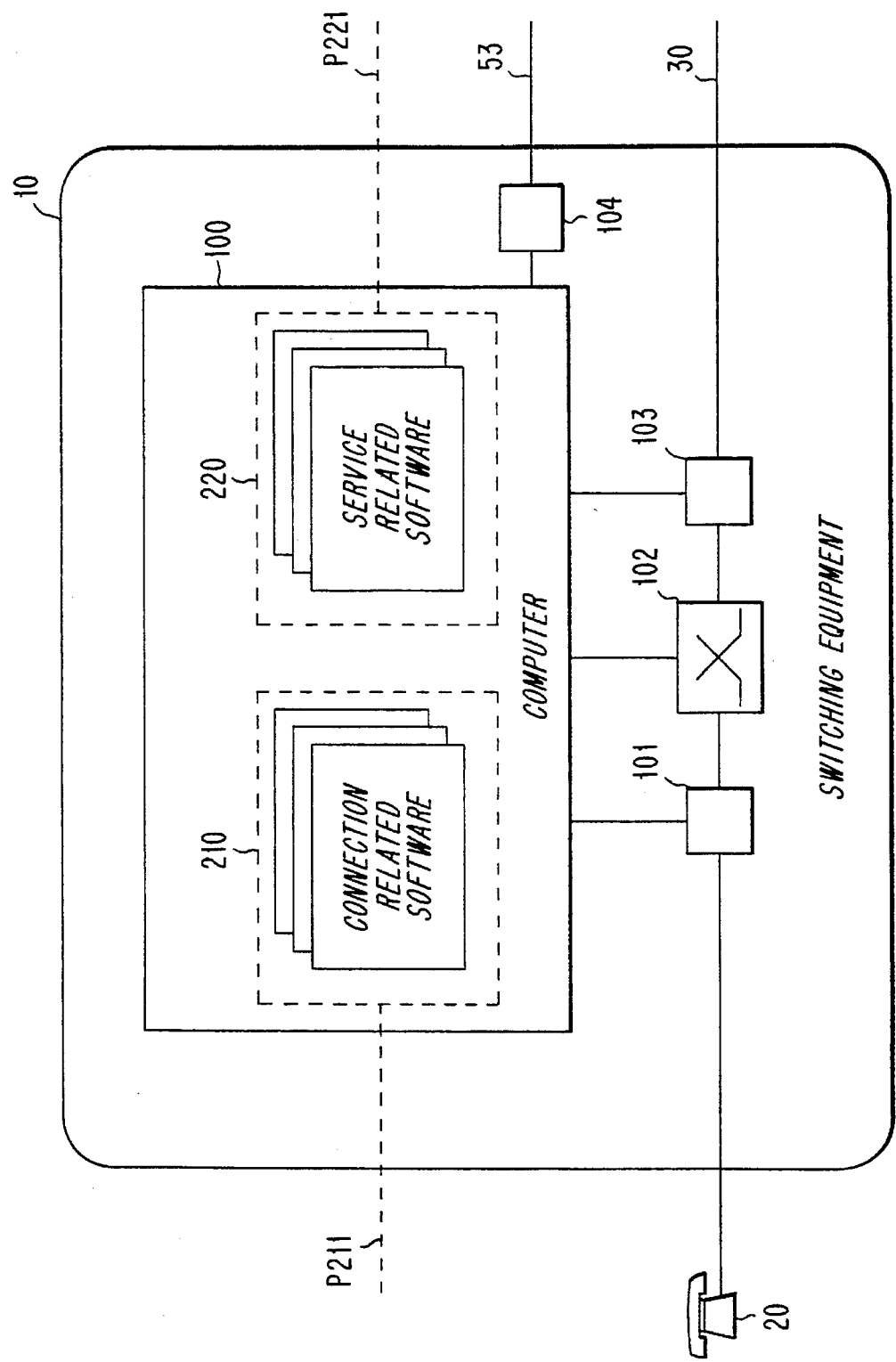
FIG. 8 illustrates the functionalities of a telephone exchange in which the software is divided into a service-related software group and a connection-related software group.

According to the present invention, the software of computer 100 in FIG. 2 is divided into two groups of software, i.e., a connection-related group 210 and service-related software groups 220, in the manner illustrated in FIG. 8. When the two groups have mutually different protocols, the group 210 will have the protocol 211 and the group 220 the protocol 221. The gains achieved by dividing the software in this way are evident from FIG. 9, which illustrates a network constructed in accordance with the invention. The software of respective nodes 10, 11 and 12 is constructed from the aforesaid two groups of connection-related software and service-related software 210, 220. Thus, the service-related software group 220 directly establishes protocol P221 between the service-related software in those telephone exchanges 10 and 12 which handle the subscribers 21, 22 for which a telephone call shall be connected. When establishing the telephone call connection in the illustrated transit case, i.e., where the actual speech connection 30 must be established via the transit exchange 11, the connection-related groups of software 210 will communicate from exchange to exchange with the aid of the protocol P211 in the manner of present-day telephone exchanges, so as to establish trunk connections 30 between the exchanges. Thus, it is the trunk connections 30 which carry the telephone calls. In this way, service-related software 220 can only be added to, for instance, those telephone exchanges which handle subscribers in a given company and, in this way, offer the company subscribers special services, since no direct signal paths are found between these telephone exchanges, these signal paths being used for service control. The connection or signalling paths between these telephone exchanges can then be permitted to pass over selected telephone exchanges in the network. For instance, the callback service or the card number service can only be added to the exchanges 10 and 12 in FIG. 9, i.e., to those exchanges to which the subscribers concerned are connected, whereas other exchanges in the network, in the illustrated case the transit exchange 11, need not have knowledge of these services and will not therefore have protocol which supports the newly added services. In other words, it is easier to add new services to the telephone network. FIG. 9 illustrates an example of a principle central to the present invention, namely the principle of dividing signalling into two parts.

However, the problem of extending the protocols so that they will support the new services still remains unsolved. Thus, it is necessary for the software 220 to be aware of the protocol which controls handling of the service concerned. Different services have different protocols. It is also necessary for the service-related software to ensure that they signal with the correct protocol to the correct receiver. The present invention also provides a solution to this problem. According to the present invention, this solution is achieved by constructing service-related signalling in a modular fashion, in the manner described in more detail below. A basic protocol which permits modular construction is appended to the present patent application. The nomenclature used in the basic protocol is specified in some more detail than the general nomenclature used in the descriptive part of the patent specification, although it will be self-explanatory to the skilled person, since conventional nomenclature has been used. Points A. and B. above have therewith been described.

Signalling via signal paths according to point C. above will now be described with reference to FIG. 10, which illustrates two groups of service-related, or service-controlling, software, namely the software groups 220A and 220B. These groups are found in the two telephone exchanges in the network which form the terminal points of a connection and which, in accordance with the invention, have a direct signal path therebetween. Signalling, i.e., the total protocol, is divided into two parts, of which one part is a protocol establishing signal path 240 between the group 220A of software 230, 231 which handle the A-subscriber side of a connection, and a group 220B of software 232 which controls the B-subscriber side of the connection.

The software 230 and 232 on respective sides of the connection are able to communicate over this signal path with a protocol 241 which is carried by a basic protocol (described below) along the signal path between the respective software groups 220a and 220b. The software is that which handles a call from the A-subscriber at a given moment in time. The signal path passes between the groups 220a and 220b of software which control, or handle, the A-subscriber call and the B-subscriber call at a given moment in time. The signal path is controlled with the aid of the basic protocol 240 and is used to carry protocol of type 241 between the software in the groups 220a and 220b. In addition to the basic protocol, protocols other than the aforesaid protocol dialogues 241 can be added. These additional protocol dialogues 241 are protocols which enable software in the group 220a to communicate with software in the group 220b. These dialogue protocols 241 are specific to each specific service and specific functionality respectively. For instance, a dialogue protocol can be used for standard telephony, so called POTS, while another protocol may be used for the callback service feature, and a third protocol can be used for transferring a call when the number called is engaged, and so on.

Thus, 240 identifies a basic protocol which can be used to establish a signal path between the groups 220a and 220b. A special protocol can be established between those groups of software which shall communicate with one another via the established signal path, for instance groups 230 and 232 in FIG. 10. The aforesaid dialogue protocols 241 are thus established along the signal path 240.

Figure 10:
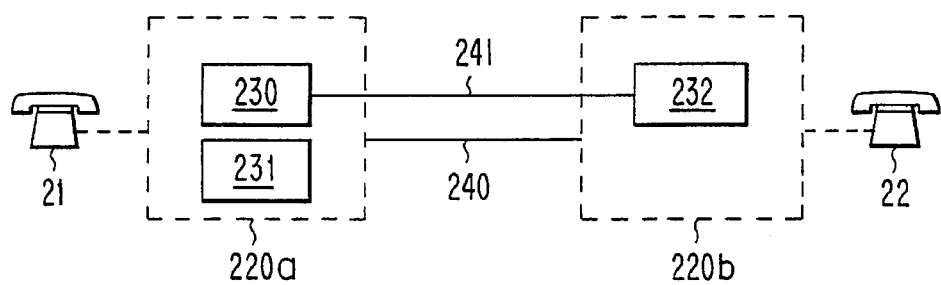
FIG. 10 illustrates two telephone exchanges whose respective software signal with one another with the aid of a protocol designed in accordance with the invention, this signalling relating to the establishment of signal paths between a first service-related software group which handles a first subscriber, and a second service-related software group which handles a second subscriber, with the aid of a basic protocol designed in accordance with the invention.
Figure 11:
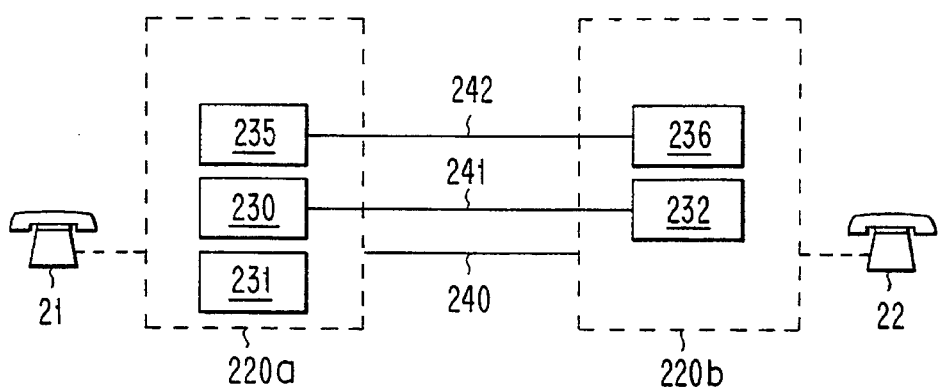
FIG. 11 is an illustration similar to the illustration of FIG. 10 but relating to the signalling of two specific services, each having its own specific protocol which is added to the basic protocol.

FIG. 11 is an illustration similar to the FIG. 10 illustration and shows the possibility of parallel dialogues 241 and 242 which pass along the same signal path, with the aid of the group protocol or basic protocol 240. When the dialogue 241 is a POTS-dialogue, the dialogue 242 may be a callback service where the A-subscriber 21 requests the B-subscriber 22 to be called back, wherewith corresponding software 235 request monitoring of the B-subscriber. When the B-subscriber replaces the receiver and is no longer engaged, the software 236 informs the software 235 to this effect with an operation in the dialogue protocol 242 and the software 235 handles the response to the callback request.

When comparing this method of procedure with procedures in existing telephone networks, it is found that the existing telephone networks have only one protocol between the groups of mutually cooperating software in the terminal exchanges of the connection. Immediately a new function is to be introduced into the existing telephone network, it is necessary for the single protocol to be changed, supplemented with new messages and new data elements. It is necessary to reconstruct the protocol for each new service introduced. With the aid of the principle of parallel protocols proposed in accordance with the invention, the signalling between telephone exchanges can be built-up in a modular fashion. It is convenient to have a fundamental protocol which will handle the basic telephony service POTS and which is common to all subscribers in the network, i.e. common to both company subscribers and individual subscribers. Separate protocols can be added to the basic protocols for subscribers in a company group, for instance protocols for card-number services, call transfers in the event of engaged numbers, etc. Thus, it is not only easy to add new software for new functions in the network, but also possible to extend signalling in the network in a modular fashion.

It will be evident from the aforegoing that the total protocol is divided into two parts, namely:

1. The basic protocol which has a general part called RDS (Remote Dialogue Service) and which enables a signal path to be established and also enables dialogues to be established on this signal path; and 2. Dialogues which are established along the signal path and which constitute a specific part-protocol for each pair of software 230–232 and 235–236 which need to communicate with one another for the function desired.

Figure 12:
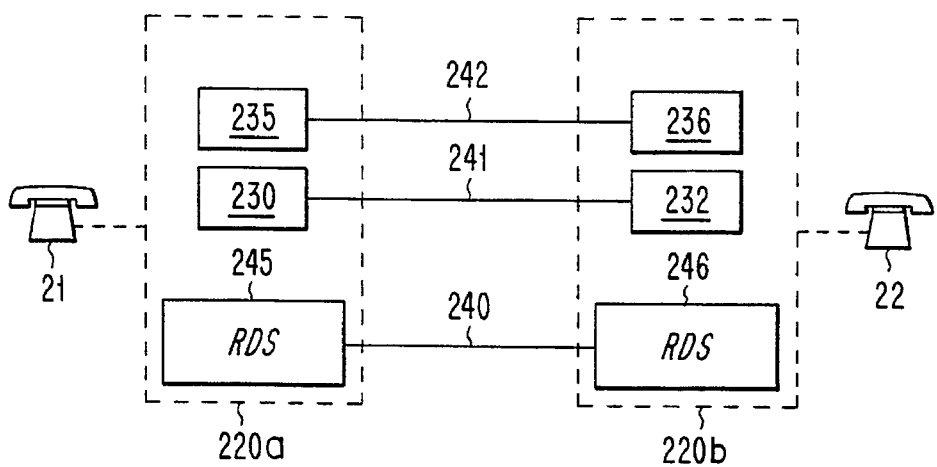
FIG. 12 is an illustration similar to the illustration of FIG. 11 but includes a handler for handling the basic protocol.

In principle, FIG. 12 illustrates the same subject matter as FIG. 11, although in this case there is shown the basic protocol (RDS) controlled, or handled, by a separate handler 245 and 246. These handlers 245, 246 thus establish a signal path between the group 220a and the group 220b for a given telephone call connection, and also manage the establishment of dialogues on this signal path.

Figure 13:
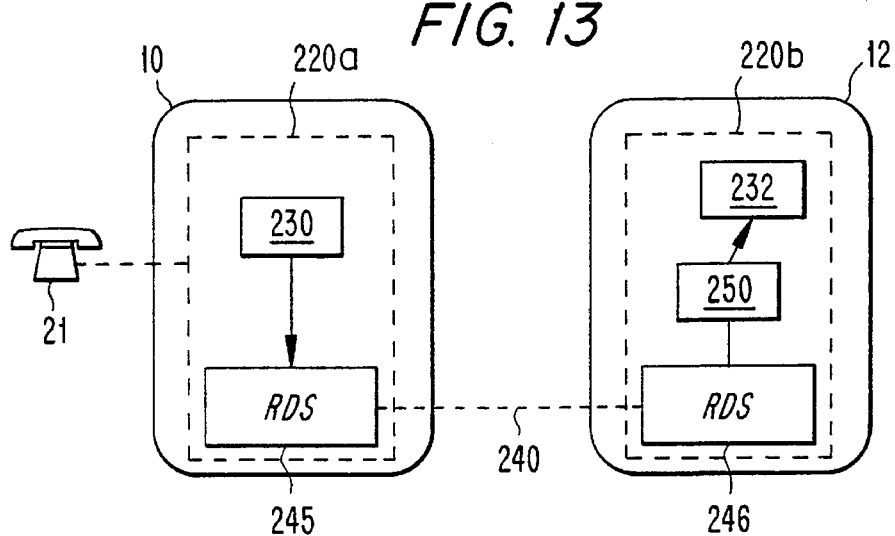
FIG. 13 illustrates the establishment of a signal path with the aid of the basic protocol.

FIG. 13 illustrates the manner in which the signal path is established between two groups 220a and 220b. The software 230 endeavours to establish a signal path to the software group 220b which handles the B-subscriber in the telephone exchange 12. The software 230 is included in the group of service-related software 220A. The software 230 requests its handler 245 to establish a 241-type dialogue with the group 220b in the telephone exchange 12. The call from the software 230 includes a first initiating operation of the dialogue 241 and the signalling service handler 245 packs the initiating operation in a message INITIATE in the basic protocol 240 used to establish signal paths and dialogues. The message INITIATE and the initiating operation are sent to corresponding handlers 246 in the receiving telephone exchange 12.

The message INITIATE includes a request to establish a signal path and to start a given, specified type of dialogue 241. INITIATE carries with it a first operation in the desired dialogue. The signalling service handler, i.e. the handler 246 in the receiving group 220b receives the INITIATE-message and calls a handler 250 which corresponds to the requested dialogue/functionality on the basis of the type of dialogue requested. The handler 250, implemented in software form, functions (a) to redirect signal path establishment to a final destination, when applicable and in the manner described in more detail below, and (b) to start the group 220b of software which shall control the B-subscriber in the call connection, when the final destination has been reached.

The handler 250 analyzes the INITIATE-message in order to ascertain the dialogue requested, and on the basis of the result of the analysis the establishing handler 50 can choose to:

Accept the call. This results in the creation in the receiving telephone exchange 12 of an execution environment for software group 220b for handling the telephone call to the B-subscriber, and a signal path is established between the earlier group 220a, which included 230, and the new group 220b. The establishment handler 250 will then also start software 232 which is to handle the requested service corresponding to the specified type of dialogue 241. The software 232 is indicated by the type of dialogue 241. The manner in which the software 232 is addressed will depend on the logic used in the establishment handler 250. When the program 232 has been started by the handler 250, the program will receive the operation sent by software 230 and reply back to the software 230 via an own operation.

The handler 246 will pack a new message, called CONTINUE, in the protocol 240 in the reply. A signal path is now established between the pair of groups of software 220A and 220B, and a dialogue 241 is established between the software groups 230 and 232. New operations in the dialogue 241 can now be sent between the mutually coacting software programs with the aid of the CONTINUE-message in the protocol 240, along the signal path.

When the call has been answered in this way, the signalling service handlers 245 and 246 will maintain a signal path between the execution environments, i.e., between the groups of software 220a and 220b, and will also maintain a dialogue (241 in FIG. 10) on this signal path. The software 230 and 232 in the two telephone exchanges can use this dialogue for continued communication during communication between the parties concerned.

When the need for communication between the two software groups is of the question-answer type and only one answer shall be given, the software 232 can disclose in its answer operation that no dialogue shall be established, and in this case the handler of signalling service 246 will send the answer with an END-message instead of with a CONTINUE-message, as in the earlier case. In this case, the answer will be delivered to the software 230 in the same manner as that described above, although the signalling service handlers 245, 246 will not establish a signal path between the execution environments.

Reject the call. Subsequent to the aforesaid analysis, it may be that the handler 250 is unable to identify software that is capable of handling the dialogue of the type requested and will therefore reject the call. The establishing handler 246 packs into the response a message called ABORT. The ABORT-message is sent to the signalling service handler 245 in the originating telephone exchange. In turn, the handler 245 informs the initiating software 230 that establishment of a signal path has failed.

The ABORT-message may also include an explanation of why the attempt to establish a signal path has failed. For instance, this message may have the form of a fail-code-number. The A-subscriber may be informed of the reason for a failure in the call connection attempt, either by means of a tone or by means of a spoken message. In this case, no signal path will be established.

The establishment of a signal path involves sending a CONTINUE-message or a BEGIN-message back to the receiving exchange, together with information relating to the sender, i.e., a reference to the group 220b. The A-side will thus send its INITIATE-message and its reference, and the B-side will send its reference in conjunction with the first CONTINUE-message or BEGIN-message. The A-side and the B-side then continue to exchange CONTINUE-messages when operations in the dialogues established in the signal path shall be transferred.

Figure 14:
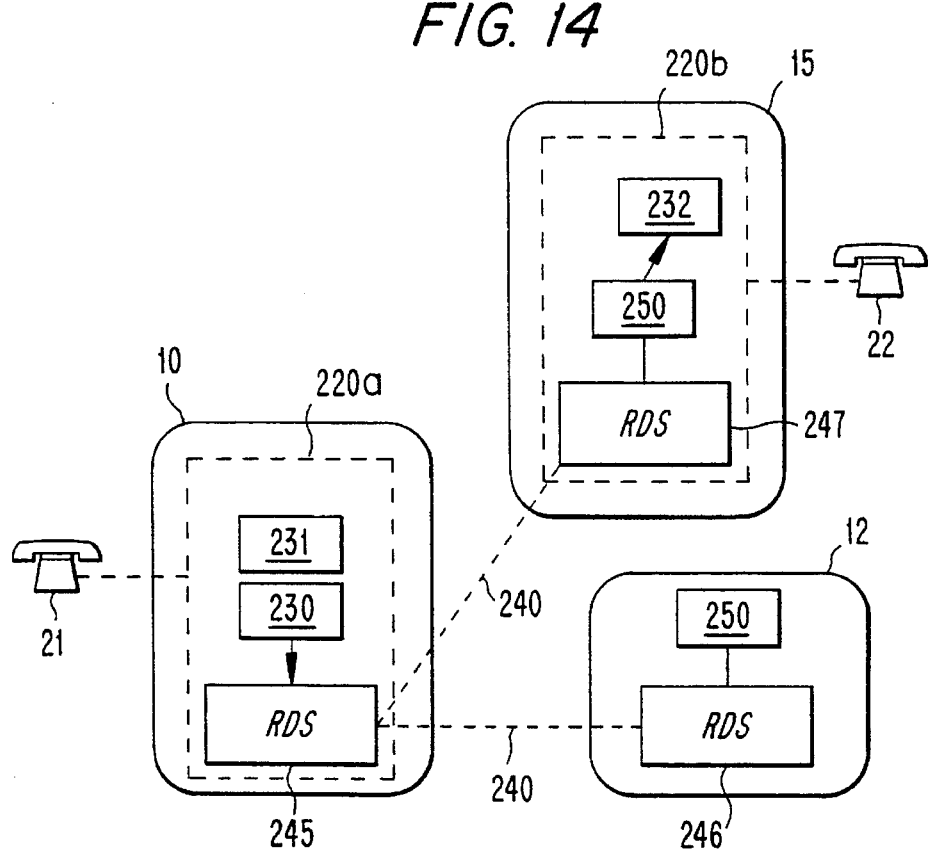
FIG. 14 illustrates how the establishment of signal paths can be redirected with the aid of the inventive signalling principles.

To redirect the call. In this case, the request for the establishment of a signal path is neither successful nor rejected. Instead, another telephone exchange in the network in which the attempt to establish a signal path shall be made is pointed-out. This is illustrated in FIG. 14. Handling of the attempt to establish a signal path in the receiving telephone exchange 12 is similar to that described above in the case when the call is accepted. In this case, subsequent to analysis, the handler 250 will discover that the attempt to establish a signal path shall be redirected to the telephone exchange 15, e.g. by incorporating a data base (not shown) which contains telephone exchange authority of subscriber numbers into the handler 250. Thus, in this case, the telephone exchange 12 functions as a network data base for, e.g., a region. In this case, the handler 250 will inform the handler 246 that establishment of the signal path shall be redirected to the telephone exchange 15. Upon receiving this message, the handler 246 sends a REDIRECT-message to the handler 245. The REDIRECT-message includes the address of the telephone exchange 15 that has been pointed-out. The signalling service handler 245 in the node 10 again packs in the operation of the software 230 a new INITIATE-message in the protocol 240 and sends this INITIATE-message to the telephone exchange that has been pointed-out, in this case the telephone exchange 15, in the same manner as that described above. The software 230 which originally initiated the request for the establishment of a connection path is not informed of the fact that the call has been redirected. The INITIATE-message is now dealt with in the telephone exchange 15 in the same manner as that described above. However, the request from software to 230 for the establishment of a signal path can be subjected to renewed redirection with a new REDIRECT-message in the telephone exchange that has been pointed out, this further redirection indicating another telephone exchange. Redirections can be carried out in this way until the establishment of a signal path has been accepted in a telephone exchange or until the request for a signal path has finally been rejected.

When the signal path establishing handler 250 in the telephone exchange is, for instance, a data base or coacts with a data base, the telephone exchange 12 will thus contain the information necessary for achieving redirection of a request for the establishment of a call connection. This network data base will, for instance, keep an account of all subscriber numbers within a certain geographical area, for instance. The advantage achieved by establishing a signal path in this way is that the originally called computer software 230 is not influenced by whether the initially indicated telephone exchange 12 is the local exchange which controls the B-subscriber or whether one or more network data base functions are activated in order to identify which telephone exchange shall control or handle the call. Thus, it is possible to introduce new functions subsequently in only one place in the network, without modifying protocol or the existing software in the network telephone exchanges.

Referring now to FIG. 12. After acceptance of the INITIATE-message described with reference to FIG. 14, additional dialogues can be created between groups of software 220a and 220b in the two mutually cooperating telephone exchanges. By way of example of the use of this mechanism, it is assumed that the software groups 230 and 231 contain functions for establishing telephone call connections or signal paths between subscribers. In one given telephone call, it is assumed that the B-subscriber is engaged and that upon receiving the engaged signal chooses to request a callback service. In the software group 220a which controls the A-subscriber, software 235 will begin to execute the callback request. This software 235 then needs to request the initiation of the callback procedure when the B-subscriber is free. The software 235 commands the signalling service handler 245 on the A-subscriber side to establish a further dialogue along the signal path. A first operation is added along the dialogue together with this request. The handler 245 on the A-subscriber side will then pack a BEGIN-message in this operation to the handler 246 on the B-subscriber side. The handler 246 will then establish new dialogue on the B-subscriber side and deliver the transmitted operation to the software group 220b which controls the B-subscriber side. On the basis of the type of dialogue established, these software programs in the software group 220b decide which software shall handle signalling of the new dialogue. This latter software receives the operation from the software 235 on the A-subscriber side. It is assumed in this case that a separate software program 236 is started for handling the callback request and that this software 236 will communicate with the software 235 via the established dialogue.

The establishment of additional dialogues on a signal path can either be rejected or answered directly with a single message, in the same manner as that followed when establishing the first dialogue. However, a dialogue cannot be redirected along an existing signal path. The term redirection solely relates to the establishment of a signal path.

When either of the software programs 230, 231, 235, 236 no longer requires continued dialogue, the dialogue in progress is stopped in the following way: It is assumed that the software 232 takes the initiative in stopping the dialogue 241, with the aid of the software 230. The software 232 then commands the handler on the B-subscriber side to stop the dialogue. This command may carry to the software 230 a last operation, in a manner corresponding to the establishment of dialogue. The handler 246 on the B-subscriber side packs this last operation in an END-message to the handler 245 on the A-subscriber side. The dialogue between the software 230 and the software 232 stops herewith. Subsequent to having stopped the last dialogue on a signal path in accordance with the above, the handlers 245 and 246 dismantle the signal path.

In this way, it is possible to introduce functions which define how subscribers can find one another in a telephone network, to define a procedure for numbering in the telephone network without needing to involve all local exchanges. Thus, it is not necessary to involve the software of all telephone exchanges in the network in order to introduce a function of the kind just described. It suffices to add such a function at some point in the network, whereafter all exchanges in the network are able to utilize the added function.

Figure 4:
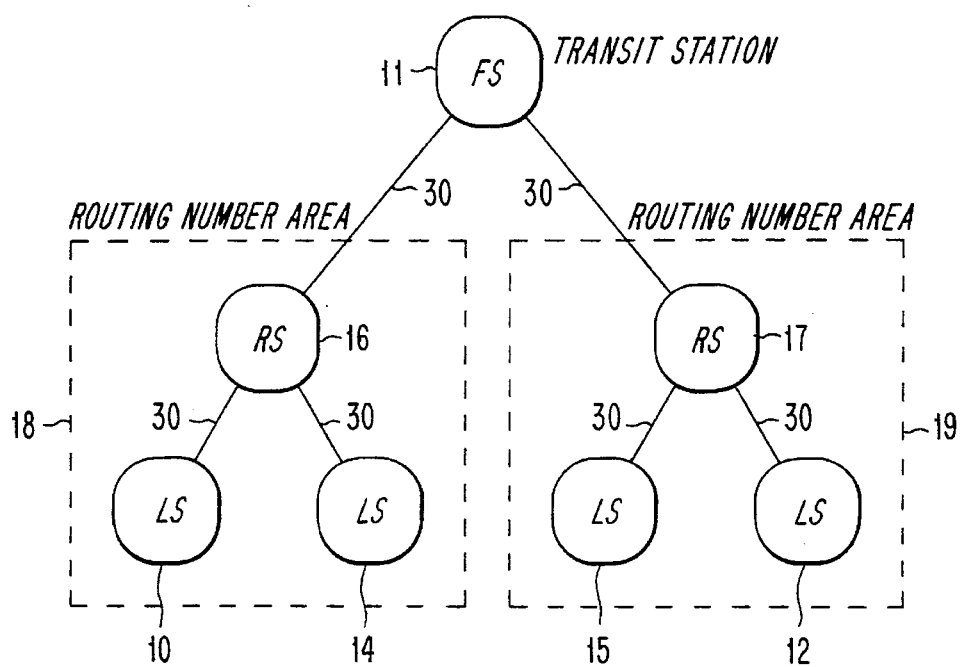
FIG. 4 illustrates an hierarchically constructed telephone network comprising local exchanges, routing number exchanges and a transit exchange, all in accordance with know techniques.
Figure 15:
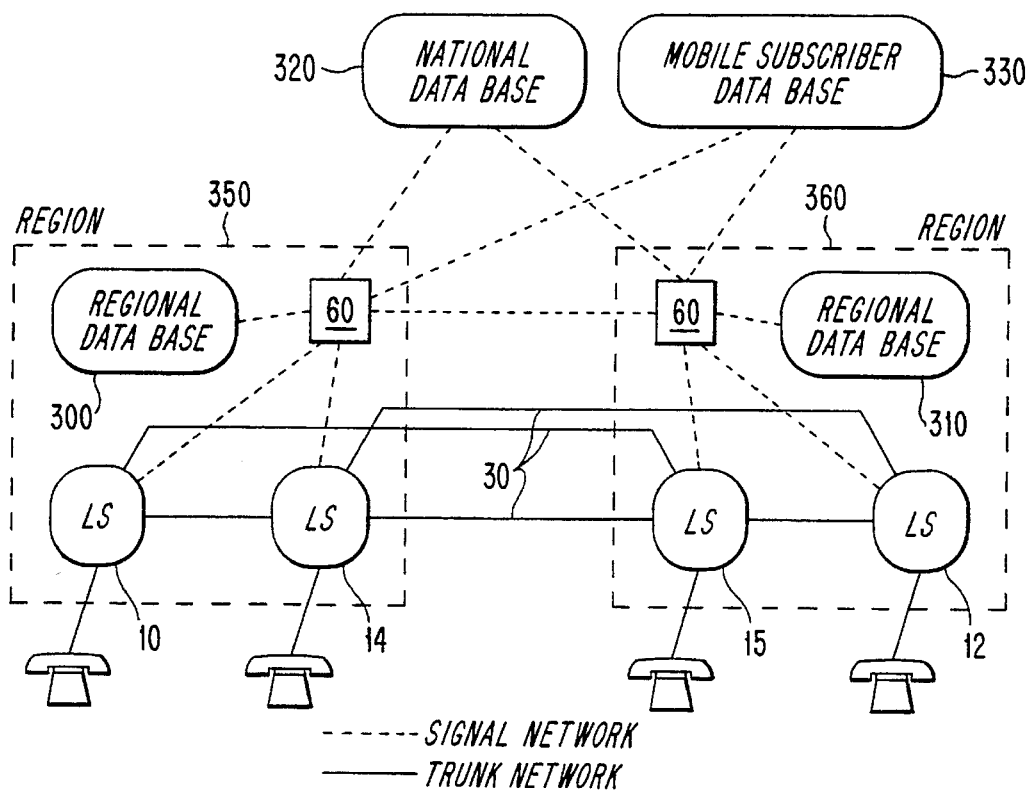
FIG. 15 illustrates an example of how telephone calls can be routed in a telephone network constructed in accordance with the invention.

The aforedescribed redirection principle can be applied in many different ways to construct a telephone network. A number of these are illustrated below. Redirection is used generally to release the telephone number of a subscriber from a geographically fixed telephone exchange. According to the present invention, the known telephone routing principle described with reference to FIG. 4 can be replaced with a hierarchy of data bases in the manner illustrated in FIG. 15. Instead of connecting traffic to routing number exchanges 16, 17, as the case of the FIG. 4 illustration, there is used a hierarchy of data bases 300, 310, 320, 330 which are used to establish signalling directly between the local exchanges 10, 14, 15, 12. The speech connection is then established in an optimal manner between the telephone exchanges concerned. This obviates the need for traffic to follow the information disclosing the whereabouts of a subscriber incorporated in the subscriber telephone number. Instead, there is created a structure of regions 350, 360. Each region includes a regional data base 300 in region 350, and a regional data base 310 in region 360. The regional data base keeps an account of where all subscribers in its region are connected at that moment in time. Similarly, the regional data base 310 keeps an account of all subscribers in its region 360 and is aware of which local exchanges 12, 15 these subscribers are connected at that moment in time. Upwards in the hierarchy are also found national data bases, for instance a data base 320 for telephone subscribers, another national data base 330 for mobile subscribers. All national traffic is handled over these national data bases, for instance when a subscriber in region 350 wishes to communicate with a subscriber in region 360.

As an alternative to the aforedescribed total release of the telephone number from a geographically fixed telephone exchange, the connection between the national number of the subscriber and the routing number area can be retained, while within the routing number area, i.e., within the region 350, for instance, some form of connection between the subscriber number and a specific telephone exchange within the routing number area is provided. A subscriber can thus retain its telephone number when moving within the routing number area and therewith switch connection from one local exchange to another. It is therewith possible to avoid the aforesaid drawbacks that are encountered when extending the telephone network, for instance.

If it is assumed that total release of the telephone number of a subscriber from a geographically fixed local telephone exchange also includes the routing numbers, it is possible for the telephone number to be no longer bound to a specific telecommunication network, in other words, to use one and the same "telephone number" both in the telephone network and, for instance, in the mobile telephony network, or in a data packet network or a person-paging network, etc. In other words, a person can be allocated a "personal telephone number" which will enable the person to be reached irrespective of the network in which said person is located and the location in the network in which the person can be found at that particular time. The practical expedients with which these solutions can be achieved are known to the art. For instance, there may be used in the telephone network a so-called "smart card" which when inserted into a telephone set will provide the network data base with information to the effect that the person holding the card can be reached at this telephone set at that particular time. The "telephone number" is therefore connected to the card holder (person) and not to the telephone set. It is possible in this way for the network to divulge that the person concerned is at home, in the office, or is out-and-about and carries a mobile telephone, wherewith the mobile telephone informs the network of its location in the mobile telephony network with the aid of known signalling procedures.

The technique involving the use of data bases can also be employed on a lower level, for instance on a company level, in order to keep an account of the whereabouts of a given person within the company at any particular moment in time. In this case, each company employee is allocated a "company number" and retains this number during the full term of his/her employment within the company, irrespective of whether the person concerned later moves within the company, either within one and the same building or between buildings within one and the same region in those cases where different buildings are connected to different local exchanges, or whether the person concerned moves between company buildings which are located within different regions 350, 360. This method obviates the need for incoming traffic to company employees being handled centrally by the company in a central switchboard, as is often the case in present-day telephone networks. Instead the company data base keeps an account of the whereabouts of a given person at any particular moment in time and redirects the traffic to the location of the person concerned. The advantage with this is that a signal path is first connected between the A-subscriber and the B-subscriber with the use of information contained in the data base and only then is a connection path, for instance a speech channel, established between the A and B subscribers. This speech channel can then always be established in the most beneficial manner, since at this stage the telephone exchange of the A-subscriber is aware of where the call shall be routed. This obviates the need of first connecting the call to a transit exchange or national exchange and thereafter switching the call to the B-subscriber. This possibility of selecting an optimum connection path is particularly beneficial in the case of modern telecommunication services which require connections that have very large bandwidths, for instance the transmission of TV-signals, in which case the connection paths are extremely broad and expensive. It is necessary to be able to use the network to an optimum in circumstances such as these.

Figure 16:
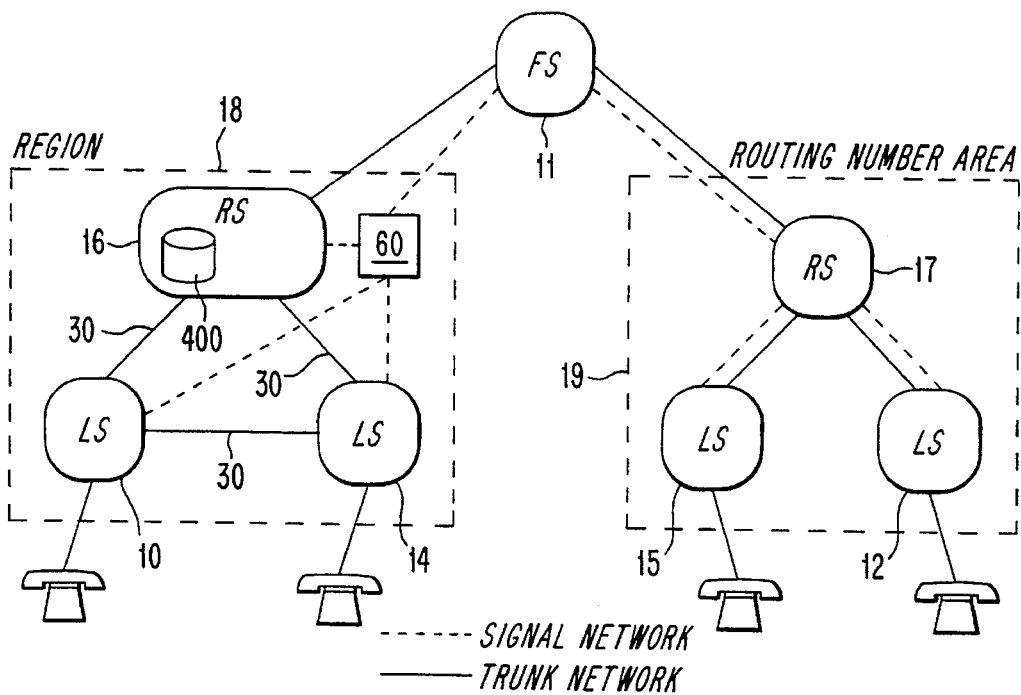
FIG. 16 illustrates a method of extending an existing, conventional telephone network successively to a telephone network constructed in accordance with FIG. 15.

Another way of constructing a network in which the telephone number is released from a geographically fixed telephone exchange is described in more detail below with reference to FIG. 16. FIG. 16 illustrates a network structure similar to the network structure shown in FIG. 4, where a data base function 400 is integrated with the routing number telephone exchange 16. Instead of connecting traffic which shall pass between the local exchanges 10 and 14 via the routing number telephone exchange 16, the data base 400 will redirect the traffic directly to the local exchange 14 when the INITIATE-message is received by the exchange 16. If the call should then be routed to another routing number area, the routing number exchange 16 will accept the request for a signal path to be established and then connect the call to the transit exchange 11 in a traditional fashion, as described with reference to FIG. 4. Thus, in the case of a telephone network that is constructed in the traditional manner, it is only necessary to provide the routing number telephone exchanges with a data base function in order to apply the principles of the invention. It is also possible to supplement the routing number telephone exchange with a data base function solely within a routing number area in the national network and therewith release the telephone numbers within this area from the geographically fixed local exchanges. Remaining routing number telephone areas within the country will then function traditionally with telephone numbers which are bound to geographically fixed telephone exchanges. Thus, the traffic within the remaining part of the country will be connected in a conventional manner, while in the routing number area 18 "free" telephone numbers will apply in principle, since the redirection of calls will apply within this routing number area 18 as described with reference to FIG. 14. This method enables the network structure of a country to be extended stepwise to the novel inventive network structure. The purpose of the data base 400 is thus to identify the local exchange which controls the B-subscriber. A signal path is then connected from local exchange to local exchange in the most optimum manner. As before mentioned, this procedure is highly beneficial when concerning traffic which requires a large bandwidth and therewith utilize a large part of the network resources.

Figure 17:
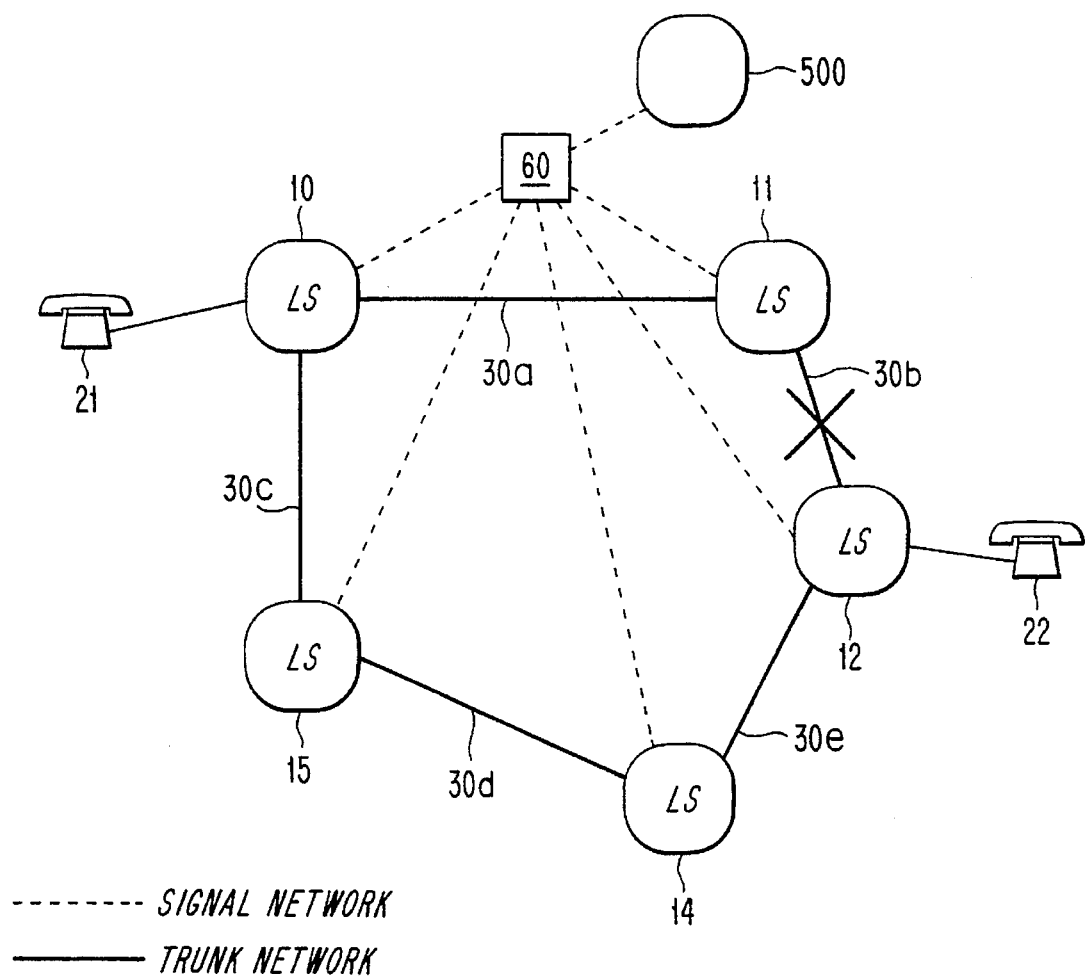
FIG. 17 illustrates an application of the inventive signalling principle in a telephone network, with the intention of providing alternative paths in the event of an interruption in the network.

Hitherto, the description has been concentrated on how a service-related group of software 220 coact with one another. However, this signalling method is not only applied with service-related software, but also with all types of software, thereamong the connection-related group of software 210. FIG. 17 illustrates an example of how a connection can be established with the aid of the inventive principles. When signalling has identified the end points of the desired connection in accordance with the aforedescribed, and the software groups 220A and 220B, which are found in those telephone exchanges to which the A and the B subscribers are connected, have established a connection and identified that a telephone call connection shall be established (e.g. have ascertained that the B-subscriber is not engaged and that it is time to establish a speech connection between A and B, or a broadband connection when concerning communication between computers, for instance), the connection related software 210 in respective telephone exchanges is initiated, this software functioning to establish the desired connection. The software 210 use precisely the same signalling procedure as that described above with reference to the handling of services to establish mutual connections. Thus, the signalling procedure is used in this case to set-up a signal path between those software groups which need to cooperate with one another in the various telephone exchanges in order to establish the desired connection. Thus, connections between connection-related software 210 must be established between the telephone exchanges 10, 11 and 12 in accordance with FIG. 9, a the speech channel passes this way because no direct trunk line 30 is found between the local telephone exchanges 10 and 12 in this particular case. Central functions similar to those described with reference to FIG. 14 can also be used to handle signal. Such central functions, for instance data base-supported functions, are used to indicate connection paths both when the network is intact and when the network is subjected to disturbances and interference. FIG. 17 illustrates a number of local telephone exchanges 10, 11, 12, 13, 14 which are mutually connected by means of trunk lines 30. As in the earlier case, the A-subscriber 21 in the local telephone exchange 10 wishes to communicate with the B-subscriber 22 in the local telephone exchange 12. Two paths are found between the local exchanges 10 and 12, i.e., a first path 30-a, 30-b and a second path through the local exchanges 13 and 14. This second path is comprised of the trunk lines 30-c, 30-d and 30-e. The data base 500 will normally indicate the first path for setting-up the connection between 21 and 22. However, assume that the trunk line 30-b is subjected to disturbance or interference, for instance as a result of being torn-up by an excavating machine. The data base 500 will then indicate the longer and more expensive second signal path to the local exchange 12, i.e., the path which passes over the local exchanges 13 and 14. The benefit of this arrangement in comparison with conventional telephone networks will be understood from the following. In a conventional telephone network, the call is first connected to the local exchange 11, where it is discovered that the connection cannot be passed-on because of the break in the trunk line 30-b. Information to this effect must be sent back to the local exchange 10, whereafter the local exchange 10 makes another attempt to establish a connection with the B-subscriber, although now via the local exchanges 13 and 14, all in accordance with fixed routing tables. With the novel network structure, signalling is first effected to the data base 500 and is there then redirected to the local telephone exchange 11 when the network is intact. On the other hand, should the trunk line 30-b be broken, signalling will be effected from the local exchange 10 to the data base 500, from where it is redirected to the local exchange 13. The data base 500 thus keeps an account of the operational state of the trunk connections 30 in a particular area. This enables the connection path of the call to be selected optimally within the area concerned. It may also be that a trunk line between two large towns or cities is heavily loaded and that no further telephone traffic can be allowed on this particular trunk line. In this case, the data base 500 is able to redirect further traffic demands through trunk connections other than the aforesaid most optimum connections, so that traffic can still pass between the two towns. This enables the network resources to be utilized in the most beneficial manner. FIG. 17 thus illustrates another application of the signalling redirecting principle proposed in accordance with the invention.

The service-signalling and connection-signalling principles of the invention have been described in the aforegoing with reference to establishing a signal path between two subscribers. Precisely the same mechanism is used generally to establish contact between groups of software in telecommunication exchanges for speech, picture (image) or data transmission, or other telephone network equipment. For instance, the principles of the invention can be applied to find, for instance, a modem-pole, picture processing equipment, speech equipment, etc., in a telecommunication network. As will be understood, such equipment need not be found everywhere in the telecommunication network, but only at one or some locations in the network. However, all nodes in the network will have access to this equipment in the manner described above with reference to the redirection of signals.

The redirection principle can also be applied to establish contact between software in an operations support systems, i.e., a system which assists the telecommunications administration or manager in handling its telephone network and telephone exchange software. The operations-support system may, for instance, be used to obtain billing information concerning a given subscriber moving in the network. The operations-support system may also be used, for instance, to measure a telephone line from a subscriber who moves in the network. For instance, the subscriber may have logged-in on different telephone sets in the network and perhaps calls and complains of poor speech quality on his particular line. The telephone operator receiving the complaint can then use the aforedescribed signalling mechanism to find the telephone line to which the subscriber is connected at that moment in time. Information of this nature is thus always found in the network data base and the aforedescribed signalling redirection principle can be used to localize the line concerned. In this case, signalling will be effected with a dialogue in order to enable such measuring processes to be effected between first software in the telephone operator support system and second software in the telephone exchange in which the line concerned is connected- The second software will execute the measuring process and disclose the result with an operation in the dialogue. The telephone operator who receives the complaint is thus able to order an investigation of the telephone line concerned and, for instance, subsequently inform the subscriber that there is a fault on that particular line and that a repairman will be sent to put matters right. Thus, it is possible to find different objects in the network from software-related operations-support functions. For instance, when extending or expanding a region by connecting new equipment to the telephone network, it is unnecessary to update the central software with data or information concerning the new equipment in order for the central software to be able to execute operations-support functions on this new equipment. Instead, the network shall include data base functions which can identify that new equipment has been connected to the network, whereafter the operations-support software is able to control the new equipment, for instance examine, investigate and measure the equipment. It is therefore unnecessary to change or update the operations-support software when equipment is connected to the network. For instance, the network may include strategically placed measuring equipment for measuring modems in order to check that a modem effects correct conversion of speech and information to digital information. Modems can be distributed on many nodes in a network, although each individual modem can be addressed and controlled with the aid of the single measuring equipment provided.

Figure 18:
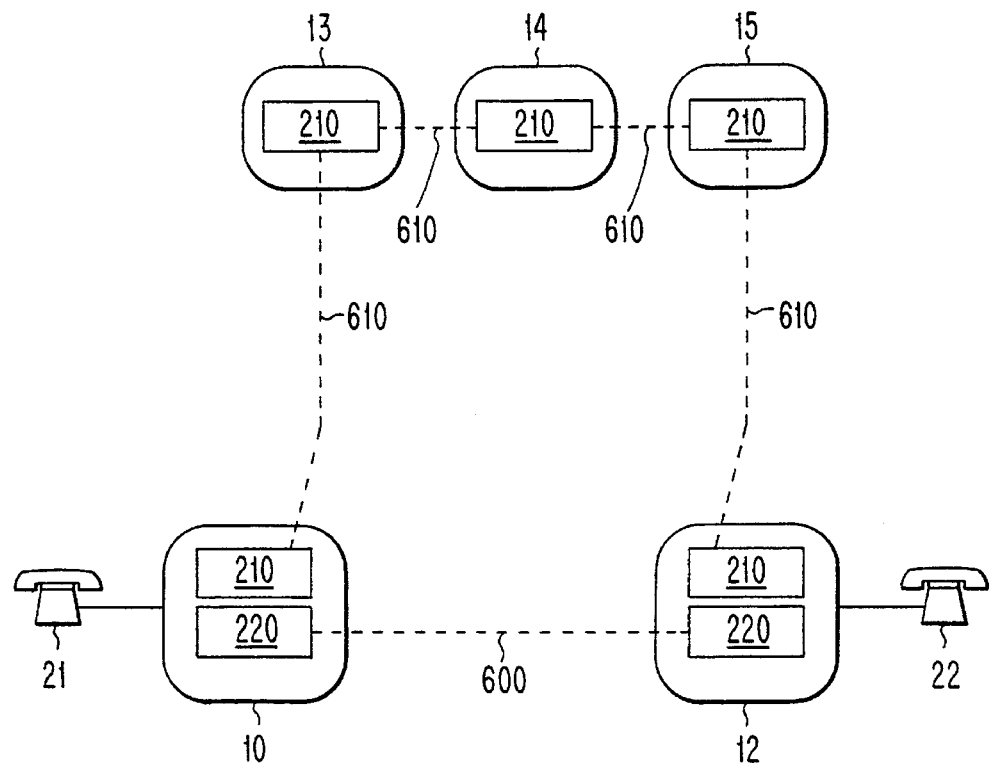
FIG. 18 is similar to the FIG. 9 illustration and shows the two different types of signalling procedures applied in a telecommunication network in accordance with the invention.

FIG. 18 is an overview which illustrates division of the signalling into two parts, namely a first service-related signalling procedure 600 and a second connection-related signalling procedure 610. The Figure illustrates a telecommunication network in which the nodes 13, 14 and 15 include solely connection-related software, i.e., in which the software is used solely to transfer speech, picture or data connection channels between intelligent local exchanges 10 and 12 which contain both service-related software and connection-related software.

Figure 19:
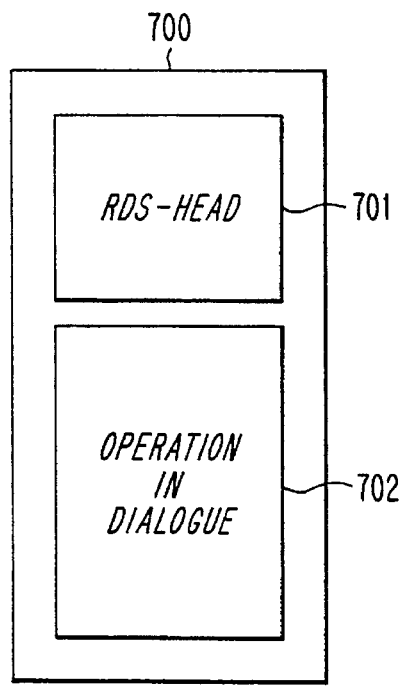
FIG. 19 illustrates the structure of a message in the basic protocol.

The protocol 240 is a basic protocol which is able to carry other protocols. FIG. 19 illustrates the structure of a message 700 which is transported between the signal services handlers 245 and 246. The message 700 is comprised of an RDS-head 701 which includes information relating to the signalling service and which can be switched between respective signalling service handlers 245 and 246, and a dialogue operation 702 which can be switched between those software groups (230 and 231 in FIG. 12) which utilize the signalling service.

A greatly simplified description of the types of message present in the basic protocol 240 will be given in the following. In the attached protocol specification, there is shown an embodiment of the signal service that can be configured with the use of other known protocol techniques which, for instance, enable the transmission of several dialogue operations in a message. A characteristic feature of the inventive protocol is that it comprises of the messages INITIATE, REDIRECT, BEGIN, END and ABORT. A common feature of all of the messages is that the RDS-head includes an address of the telephone exchange to which the message shall be delivered. The precise configuration of this address will depend on the type of underlying signal network used for the signalling process.

The message INITIATE is used to establish a signal path, in accordance with the aforegoing. The RDS-head in the INITIATE-message contains the following information: the identity and the type of the dialogue to be established initially on the signal path and address information which identifies the group of software 220a in FIG. 13, and software 230 which initiate the first dialogue. Accepted response to the INITIATE-message is REDIRECT, which is used to redirect the establishment of the signal path, END which is used for an individual operation exchange without setting-up a signal path, CONTINUE which is used to accept the establishment of the signal path, ABORT which is used to indicate the occurrence of a fault of some kind, and BEGIN which is used to accept the establishment of a signal path and, at the same time, request counter-directional establishment of a further dialogue prior to responding to the first operation in the initial dialogue.

The message BEGIN is used to establish a further dialogue on an existing signal path. The RDS-head in the BEGIN-message includes the following information: the identity and type of the dialogue to be established on the signal path and address information which identifies software 230 in FIG. 13 which initiates the dialogue. If the BEGIN-message is used as a direct response to an INITIATE-message, the head will also contain address information which identifies the group of software 220a in FIG. 13 and software 230 which sends the response. An accepted response to the INITIATE-message is END, which is used for an individual operation exchange without establishing dialogue, CONTINUE is used to accept the setting-up of the dialogue, ABORT is used to indicate that an error of some kind has occurred, and BEGIN is used to request a counter-directional setting-up of further dialogue prior to responding to the first operation in the requested dialogue.

The message REDIRECT is used to redirect the establishment of a signal path to another receiver. The RDS-head in the REDIRECT-message contains the same information as the initiate-message which it answers, and in addition an address of the new receiver.

The message CONTINUE is used to transfer an operation in a dialogue on an existing signal path. The RDS-head in the CONTINUE-message contains the following information: the identity of the dialogue with which the message is concerned and address information which identifies the own group of software 220b in FIG. 13 and software 232 and also the opposing group of software 220ab in FIG. 13 and software 230.

The message END is used to terminate a dialogue on an existing signal path. The RDS-head in the END-message contains the following information: the identity of the dialogue to be terminated and address information which identifies the own group of software 220b in FIG. 13 and software 232, and also the opposing group of software 220ab in FIG. 13 and software 230. When the terminated dialogue is the only dialogue to be established along the signal path, the signal path is also dismantled.

The message ABORT is used to terminate a dialogue on an existing signal path, as a result of the occurrence of a fault. The RDS-head in the ABORT-message contains the following information: the identity of the dialogue to be terminated, indication of an abort generated by the user, i.e., by the software 232 or 230 in FIG. 13, or an abort generated by the signalling service-related handler 245 or 246 in FIG. 13, and address information which identifies the own group of software 220b in FIG. 13 and software 232. When the terminated dialogue was the only dialogue to be established along the signal path, the signal path is also dismantled.

I claim:

1. A signalling method for establishing a signal path between a first service related software part, resident in a first node of a telecommunication network, and a second service related software part, resident in a second node of said network, a signalling network to which the first and second nodes have access, and a basic signalling protocol used for signalling between the first and second nodes, wherein said method comprises the steps of:

the first service related software part requesting a sequence of operations to be interchanged with the second service related software part, said sequence below referred to as a dialogue, said first service related software part directing said request to a first signalling service handler, said first signalling service handler in response to this request preparing an initiation message in the basic signalling protocol and includes therein, in a specific part thereof, an identity of the requested dialogue, said basic signalling protocol comprising a general part that establishes a signal path to the second node, transferring said message to said second node using a basic protocol on which the dialogue is carried, receiving said message by a second signalling service handler resident in said second node, said second signalling service handler:
analyzing said initiation message to examine the requested dialogue,
using the result of this examination to identify the second service related software part, and initiating execution of the requested dialogue, or
redirecting said signal path from said second node to a third service related software part in a third node having access to the signalling network, said executing dialogue taking place over the established signal path.

2. A signalling method in accordance with claim 1, wherein:

said second signalling service handler receives from said second service related software part a respond signal to be transmitted to the first service related software part in said dialogue, said second signalling service handler in response to the reception of said respond signal prepares a continuation message and includes therein the received respond signal, said continuation message is sent to said first service related software part over said first signal path, said first signalling service handler receiving said continuation message and delivering said respond signal to said first service related software part.

3. A method of signalling in a telecommunication network comprising nodes, trunk means connecting said nodes in such a manner that certain, but not all, of said nodes have direct trunks therebetween, and program controlled switch means provided in said nodes to switch connections in said telecommunication network, said signalling method using, for set up and for release of said connections, a basic protocol which is signalled in a signal network that optionally may use said trunk means wherein program software in each of said nodes is divided into a connection-related software part for handling connections and a service-related software part for handling services, said service-related software part resident in a node, referred to as an originating end node, to which a user that desires to establish a connection is connected, signalling directly to said service-related software part in a node, referred to as a terminating end node, at which said desired connection is to be terminated, by using a signalling process, so as to establish a first signal path that allows for direct signalling between said service-related software parts resident in said originating and terminating end nodes respectively, while said connection-related software part resident in said originating end node with the aid of said basic protocol in a second signalling process, different from said first, signals in said signal network to said connection related software part resident in an adjacent node to which there is a trunk means so as to establish a second signal path to said connection-related software part in said adjacent node, the object of said signalling taking place in said second signal path being to establish a connection between said originating node and said adjacent node, said second signalling process being repeated until said terminating end node is reached and said desired connection thereby is completed, said signalling method thus allowing for the control of service handling equipment resident in said end nodes without requiring nodes, if any, between said originating and terminating end nodes to have service-related program software.

4. A signalling method in accordance with claim 3, wherein said basic protocol comprises a general part allowing for the establishment of said direct signal path between said end nodes and a specific part allowing for the establishment of a number of additional sub-protocols referred to as dialogues, at least one of said sub-protocols supporting a basic service.

5. A signalling method in accordance with claim 3, wherein said specific protocol part in addition to said dialogue supporting said basic service also carries a dialogue that supports a supplementary service to said basic service, said program software, resident in said originating end node, handling said basic service having a direct connection, over said signal path, to said program software, resident in said terminating end node, handling said basic service, while program software that supports said supplementary service and that resides in said originating and terminating end nodes communicate with each other directly using the same signal path.

6. A signalling method in according with claim 5, wherein a call from a program resident in said originating end node includes an operation that initiates a desired dialogue.

7. A signalling method in accordance with claim 6, wherein said basic protocol allows for redirection of a signal path from an originally terminating node to a new terminating node, said redirection being initiated by said originally terminating node and being transparent to said originating end node.

8. A signalling method in accordance with claim 7, wherein said redirection process is repeated at said new terminating node.

9. A signalling method in accordance with claim 7, wherein said terminating end node interworks with a dam base and said basic protocol allows for the redirection of said signal path from the terminating node pointed out by said originating end node to a new terminating node pointed out by said data base.

10. A signalling method in accordance with claim 9, wherein said redirection process is used to release the relation existing between a subscriber's directory number and a fixed geographical position of a local exchange, anti that said data base comprises information relating to the telecommunication network in which a subscriber currently is present as well as information on where said subscriber is present in said telecommunication network.

11. A signalling method in accordance with claim 10, wherein a regional data base is handling the directory numbers of subscribers resident in said region whereby the directory numbers of said subscribers are released from their relation to the geographical positions of local exchanges within said region, said directory numbers being tied to said region thus providing a regional structure to said telecommunication network.

12. A signalling method in accordance with claim 11, wherein a number of national data bases are used, each one comprising information for the handling of a respective type of basic service thus allowing for traffic between two subscribers which are using different basic services.

13. A signalling method in accordance with claim 9, wherein a group of subscribers are assigned a common group number, that individual members of said group reports their presence in the respective nodes at which they currently are present, this report procedure being referred to as log in, that said data base comprises information on the current positions of each of said members in order to redirect calls to said members to the respective nodes at which they have logged in.

14. A signalling method in accordance with claim 9, wherein redirection is made in order to locate equipment in the telecommunication network.

15. A signalling method in accordance with claim 14, wherein said data base comprises information on nodes containing specified equipment, said signal path being redirected from said original node to a new node, pointed out by said data base, comprising said specified equipment.

16. A signalling method in accordance with claim 9, wherein redirection is used to locate operation and maintenance functionality for said telecommunication network.

17. A signalling method in accordance with claim 16, wherein said operation and maintenance functionality keeps a current record of the extent to which individual trunks within a region are used.

\* \* \* \* \*